(12) United States Patent
Chinniah et al.

(10) Patent No.: US 7,976,192 B2
(45) Date of Patent: Jul. 12, 2011

(54) REMOTELY LIT OPTICAL SIGNATURE LAMP

(75) Inventors: Jeyachandrabose Chinniah, Belleville, MI (US); Xiaolu Chen, Saline, MI (US); Edwin Mitchell Sayers, Saline, MI (US); Amir P. Fallahi, W. Bloomfield, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 273 days.

(21) Appl. No.: 12/026,622

(22) Filed: Feb. 6, 2008

(65) Prior Publication Data

US 2009/0196047 A1 Aug. 6, 2009

(51) Int. Cl.
*F21V 21/00* (2006.01)
(52) U.S. Cl. ............... 362/249.06; 362/249.02; 362/327; 362/332; 362/347; 362/308
(58) Field of Classification Search ............. 362/249.06, 362/327, 332, 347, 249.02, 308, 309, 310, 362/311.01, 311.02, 331, 800
See application file for complete search history.

(56) References Cited

U.S. PATENT DOCUMENTS

| | | | |
|---|---|---|---|
| 5,438,485 A | 8/1995 | Li et al. | |
| 5,765,934 A | 6/1998 | Okamori et al. | |
| 6,097,549 A * | 8/2000 | Jenkins et al. | 362/517 |
| 6,107,916 A | 8/2000 | Beck et al. | |
| 6,527,411 B1 | 3/2003 | Sayers | |
| 6,536,921 B1 | 3/2003 | Simon | |
| 6,717,526 B2 | 4/2004 | Martineau et al. | |
| 6,805,456 B2 * | 10/2004 | Okuwaki | 362/626 |
| 6,814,475 B2 | 11/2004 | Amano | |
| 6,814,479 B2 | 11/2004 | Aynie et al. | |
| 6,880,945 B2 | 4/2005 | Knaack et al. | |
| 7,025,482 B2 | 4/2006 | Yamashita et al. | |
| 7,160,010 B1 * | 1/2007 | Chinniah et al. | 362/511 |
| 7,168,839 B2 | 1/2007 | Chinniah et al. | |
| 7,275,849 B2 | 10/2007 | Chinniah et al. | |
| 7,422,357 B1 * | 9/2008 | Chang | 362/602 |
| 2003/0026106 A1 * | 2/2003 | Knaack et al. | 362/511 |
| 2005/0201100 A1 | 9/2005 | Cassarly et al. | |
| 2007/0024971 A1 | 2/2007 | Cassarly et al. | |

FOREIGN PATENT DOCUMENTS

EP 1 078 816 B1 10/2004

* cited by examiner

*Primary Examiner* — Jong-Suk (James) Lee
*Assistant Examiner* — Mark Tsidulko
(74) *Attorney, Agent, or Firm* — Fraser Clemens Martin & Miller LLC; J. Douglas Miller

(57) ABSTRACT

A lighting system and a method for providing a lighting pattern are disclosed, wherein the lighting system and method minimize non-uniform color and intensity in the lighting pattern, offers unique styling features, and provides design flexibility for the LED package and associated heatsinking devices. The lighting system including a light source, a first light bending device disposed adjacent the light source and adapted to receive light rays emitted from the light source and direct the light rays in a first desired lighting pattern, and a second light bending device disposed around the first light bending device, wherein the optical device is adapted to receive the directed light rays from the first light bending device and direct the light rays in a second desired lighting pattern.

15 Claims, 4 Drawing Sheets

REMOTELY LIT OPTICAL SIGNATURE LAMP

FIELD OF THE INVENTION

The present invention relates to lighting. More particularly, the invention is directed to a lighting system and a method for providing an annular lighting pattern while minimizing non-uniform color and intensity in the lighting pattern.

BACKGROUND OF THE INVENTION

The role of the Light Emitting Diode (LED) is expanding rapidly into automotive lighting applications. LEDs offer advantages in power consumption, useful life, size, and color choices. However, there are some challenges and problems in using LED light sources for automotive exterior lighting applications. These challenges include excess color shifts and intensity uniformity/variation when propagating in long optical elements such as light pipes and rings, thermal management, and associated packaging issues.

Color shifts may fail regulatory requirements and increase the LED piece price due to narrowed LED color-bin requirement. Poor thermal management shortens the LED life and can make the LED fail prematurely. Color shifts/non-uniformity and intensity non-uniformity can negatively impact the appearances of the lighting devices.

In current applications, the optical elements have extensions connecting the LEDs and the optical elements. The LED is placed in close proximity to an input end of the optical elements. In this case, the light travels along the extension section of the optical elements, resulting in light loss and unwanted color shifts. Multiple LEDs must be used and arranged in such a way that resolves the issues of color/intensity non-uniformity. However, this solution is more costly, difficult to package, and cannot be implemented in many applications.

Typically, light pipes have teeth cut on a back side of the pipe for directing light in a desired direction. These teeth are visible in the light pipe when the pipe is lit or unlit, which limits the styling features of the light pipes. Furthermore, in the existing technologies, the light travels along the pipe with undesirable effects such as decreasing intensity and color shifting, for example.

It would be desirable to have a lighting system and a method for providing a lighting pattern, wherein the lighting system and method minimizes non-uniform color and intensity in the lighting pattern, offers unique styling features, and provides design flexibility for the LED package and associated heatsinking devices.

SUMMARY OF THE INVENTION

Concordant and consistent with the present invention, a lighting system and a method for providing a lighting pattern, wherein the lighting system and method minimizes non-uniform color and intensity in the lighting pattern, offers unique styling features, and provides design flexibility for the LED package and associated heatsinking devices, has surprisingly been discovered.

In one embodiment, a lighting system comprises a light source; a first light bending device disposed adjacent the light source, wherein the first light bending device is adapted to receive a substantial portion of light rays emitted from the light source and direct the light rays in a substantially radially outward lighting pattern; and a second light bending device surrounding at least a portion of the first light bending device, wherein the second light bending device is adapted to receive the directed light rays from the first light bending device and direct the light rays in a second desired lighting pattern.

In another embodiment, a lighting system comprises a light source; a first light bending device disposed adjacent the light source, wherein the first light bending device is adapted to receive light rays emitted from the light source and direct the light rays in a first desired lighting pattern; and a light pipe surrounding at least a portion of the first light bending device, wherein the light pipe is adapted to receive the directed light rays from the first light bending device and direct the light rays in a second desired lighting pattern.

The invention also provides methods for providing a lighting pattern.

One method comprises the steps of providing a light source; providing a first light bending device disposed adjacent the light source, wherein the first light bending device is adapted to receive light rays emitted from the light source and direct the light rays in a first desired lighting pattern; providing a second light bending device surrounding at least a portion of the first light bending device, wherein the light bending device is adapted to receive the directed light rays from the first light bending device; and directing the light rays emitted from the light source to provide a second desired lighting pattern.

BRIEF DESCRIPTION OF THE DRAWINGS

The above, as well as other advantages of the present invention, will become readily apparent to those skilled in the art from the following detailed description of the preferred embodiment when considered in the light of the accompanying drawings in which.

DETAILED DESCRIPTION OF EXEMPLARY EMBODIMENTS OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
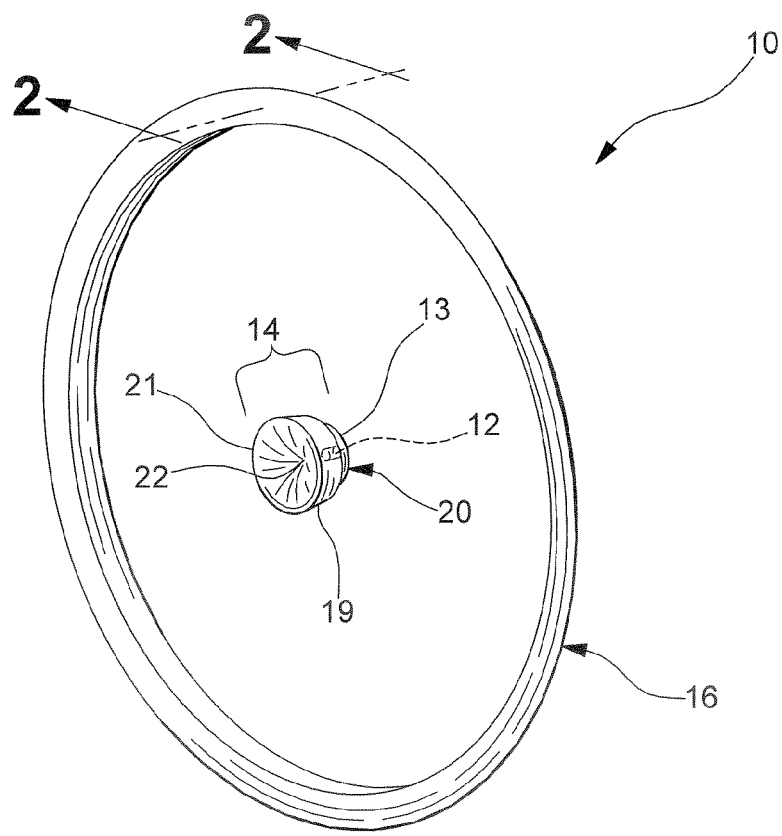
FIG. 1 is a perspective view of a lighting system according to an embodiment of the present invention.
Figure 2:
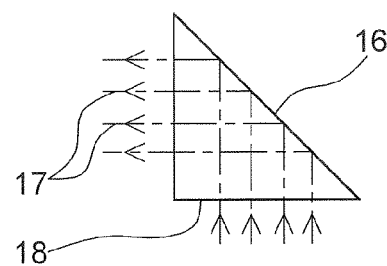
FIG. 2 is a cross-sectional view of a light pipe for the lighting system of FIG. 1 taken along line 2-2.

FIG. 1 illustrates a light system 10 according to an embodiment of the present invention. The lighting system 10 includes a light source 12, a first light bending device 14, and a second light bending device 16. The light source 12 is disposed adjacent a first side 13 of the first light bending device 14, wherein light emitted by the light source 12 is substantially collected within the first light bending device 14 and directed in a first desired lighting pattern. It is understood that the light source 12 may be any conventional light source such as an LED, for example. As shown, the second light bending device 16 is ring-shaped and disposed substantially uniformly around the periphery of the first light bending device 14, although other shapes and configurations can be used, as desired. As a non-limiting example, the second light bending device 16 may be formed into any shape such as a square, a triangle, or a custom symbol. It is understood that the second light bending device 16 may be an array of light bending devices 16. The second light bending device 16 is adapted to receive directed light rays 17 from the first light bending device 14, and bend and reflect the light rays 17 in a second desired lighting pattern, as shown in FIG. 2. It is understood that the second light bending device 16 may be formed from any conventional optical-grade material such as acrylic, polycarbonate, and an optical-grade plastic, for example.

As a non-limiting example, FIG. 2 shows the second light bending device 16 as a light pipe having a triangular cross-section. The second light bending device 16 is adapted to receive collimated light rays 17 and reflect the light rays 17 at approximately a 90 degree angle. Specifically, light rays 17 pass through the receiving end 18 of the second light bending device 16 and are reflected by a reflective surface within the second light bending device 16. It is understood that the second light bending device 16 may be adapted to bend the light rays 17 in any lighting pattern and at any angle, as desired.

Figure 3:
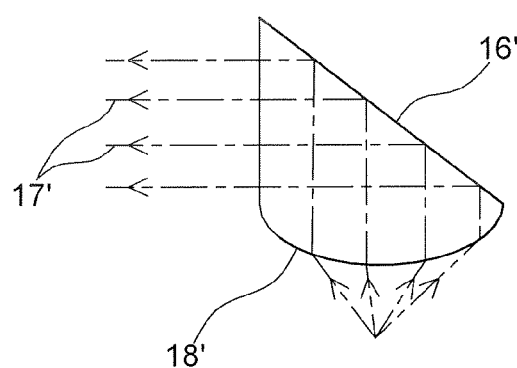
FIG. 3 is a cross-sectional view of a light pipe according to another embodiment of the present invention.

As a further example, FIG. 3 shows a second light bending device 16' as a light pipe having a convex receiving end 18'. Structure repeated from the description of FIGS. 2 and 3 includes the same reference numeral and a prime (') symbol. The receiving end 18' is adapted to receive diverging light rays 17'. As shown, the diverging light rays 17' are refracted and collimated by the receiving end 18' of the second light bending device 16'. The collimated light rays are internally reflected within the second light bending device 16' at approximately a 90 degree angle. It is understood that the second light bending device 16' may be adapted to bend the light rays 17' in any lighting pattern and at any angle, as desired.

Figure 4A:
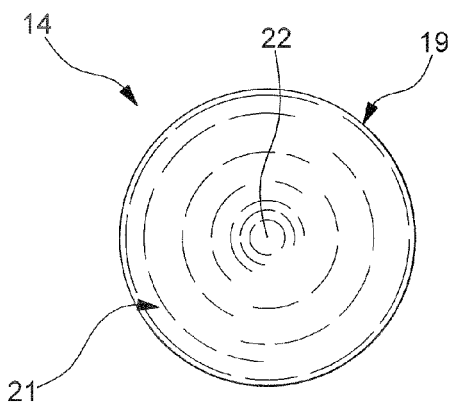
FIG. 4*a* is a front elevational view of a first light bending device for the lighting system of FIG. 1.
Figure 4B:
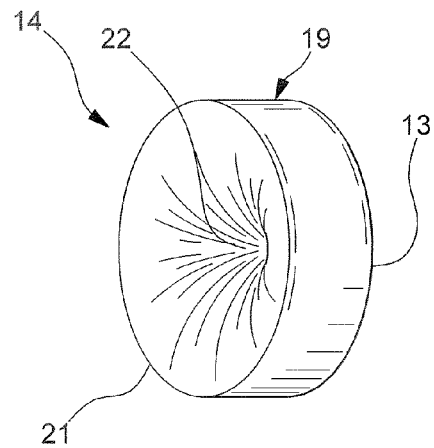
FIG. 4*b* is a perspective view of the first light bending device shown in FIG. 4*a*.
Figure 4C:
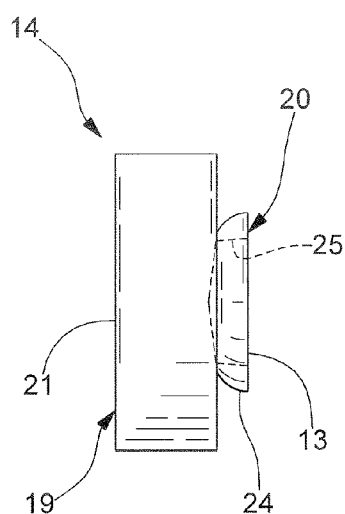
FIG. 4*c* is a side elevational view of the first light bending device shown in FIG. 4*a*.

FIGS. 4a, 4b, and 4c, show the first light bending device 14 according to an embodiment of the present invention. The first light bending device 14 includes a first portion 19 and a second portion 20. The first portion 19 is shown having a substantially circular disk shape. A second side 21 of the first light bending device 14 has a substantially parabolic indentation 22 for internally reflecting light in a substantially radially outward direction. Although the indentation 22 is shown having a substantially parabolic shape, it is understood that the indentation 22 may be any shape for producing a desired reflection pattern such as a substantially conical shape, for example. It is further understood that the first portion may include any number of indentations, as desired. The first portion 19 may be formed from any conventional optical material such as acrylic, polycarbonate, and an optical-grade plastic, for example. It is further understood that the first portion 19 of the first light bending device 14 may have any shape for internally collecting and directing light, as desired. The second portion 20 of the first light bending device 14 is shown as a refractive lens having a third side 24 and a fourth side 25. The fourth side 25 defines a cavity in the second portion 20. The curvature and shape of the third side 24 and the fourth side 25 cooperate to provide a desirable refraction pattern. As more clearly shown in FIG. 4c, the second portion 20 has a generally dome shape with a cavity formed therein. It is understood that the third side 24 and the fourth side 25 may have any shape and curvature, as desired. The second portion 20 may be formed from any optical material such as acrylic, polycarbonate, and optical-grade plastics, for example. It is understood that the first portion 19 of the first light bending device 14 may have any shape for internally collecting and directing light, as desired. The first portion 19 is coupled to the second portion 20 to provide a predetermined collimating or focusing pattern. It is understood that the first light bending device 14 may have any shape, size, and optical characteristics for collecting and directing light rays 17, as desired. It is further understood that the first light bending device 14 may include additional optical elements such as reflective surfaces and prisms, as desired.

Figure 5:
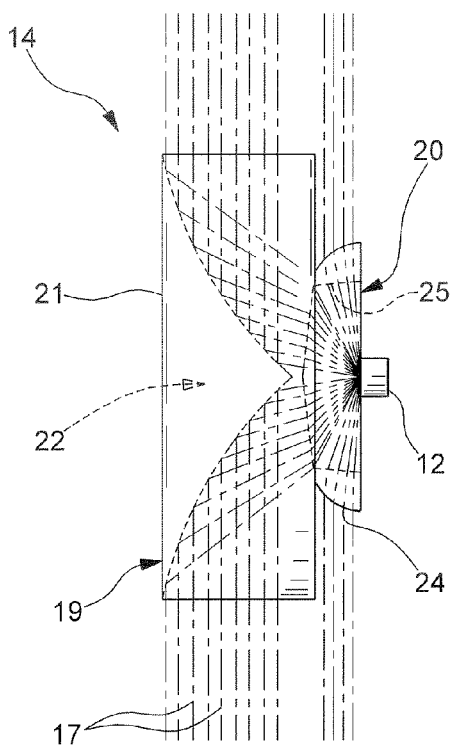
FIG. 5 is an enlarged side elevational view of the first light bending device disposed adjacent a light source for the lighting system of FIG. 1.

FIG. 5 shows an enlarged view of the first light bending device 14, wherein the first light bending device 14 receives light rays 17 emitted from the light source 12 and provides a first desired lighting pattern of light rays 17. Specifically, the light rays 17 are refracted as they pass through the second portion 20 of the first light bending device 14. A portion of the light rays 17 are substantially collimated and directed substantially radially outward from the second portion 20 of the first light bending device 14. Another portion of the light rays 17 pass into the first portion 19 of the first light bending device 14, wherein the light rays 17 are reflected by an internal surface of a surface forming the indentation 22. As shown, the surface forming the indentation 22 is adapted to reflect the light rays 17 radially outward in a substantially collimated pattern. It is understood that the first light bending device 14 directs the light rays 14 substantially uniformly around the periphery of the first light bending device 14.

Figure 6:
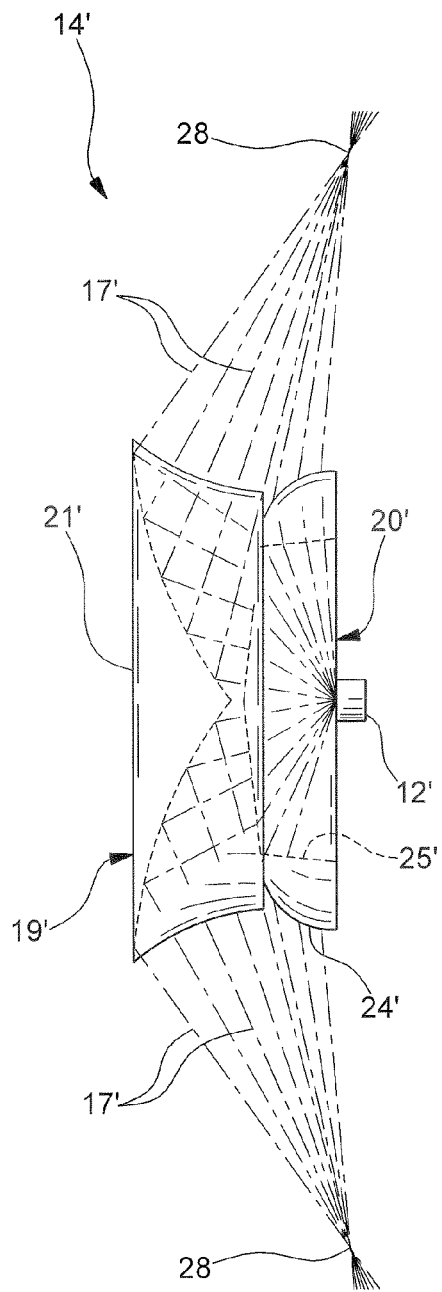
FIG. 6 is a side elevational view of a first light bending device disposed adjacent a light source according to another embodiment of the present invention.

FIG. 6 shows a first light bending device 14' according to another embodiment of the present invention. Structure repeated from the description of FIGS. 5 and 6 includes the same reference numeral and a prime (') symbol. The first light bending device 14' receives light rays 17' emitted from the light source 12' and provides a first desired light pattern of light rays 17' having a pre-determined focal point 28. Specifically, the light rays 17' are refracted as they pass through the second portion 20' of the first light bending device 14'. A portion of the light rays 17' are directed substantially radially outward from the second portion 20' of the first light bending device 14' and focused toward a pre-determined focal point 28. Another portion of the light rays 17' pass into the first portion 19' of the first light bending device 14', wherein the light rays 17' are reflected by the internal surface of a surface forming the indentation 22'. As shown, the surface forming the indentation 22' is adapted to reflect the light rays 17' radially outward in a substantially focusing pattern toward the pre-determined focal point 28. It is understood that the first light bending device 14' directs the light rays 14' substantially uniformly around the periphery of the first light bending device 14'.

Figure 7:
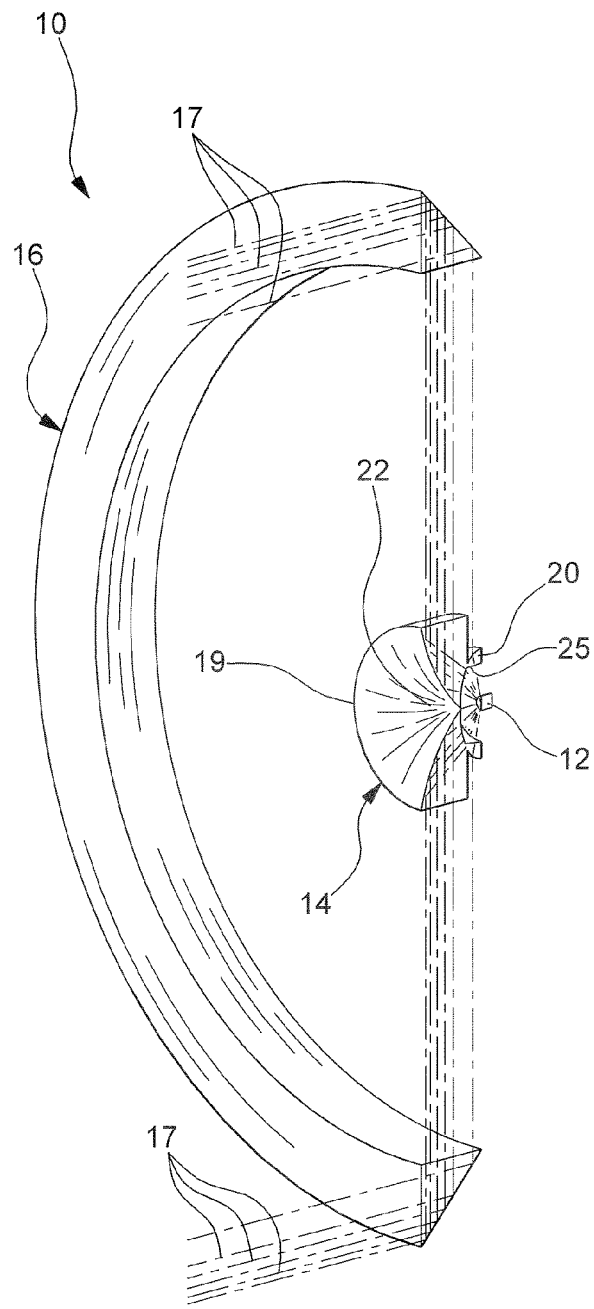
FIG. 7 is a perspective view the lighting system shown in FIG. 1 showing the light pipe and the first light bending device in section to illustrate a path of light rays therethrough.

FIG. 7 shows the lighting system 10 in use. As shown, the light source 12 emits light rays 17 into the first light bending device 14 disposed adjacent the light source 12. The first light bending device 14 directs the light rays 17 in a substantially uniform first desired lighting pattern to the second light bending device 16 disposed around the periphery of the first light bending device 14. Although only the light rays 17 along a single plane are shown, it is understood that a substantial portion of the light rays 17 emitted from the light collected device 16 are directed radially outward to the second light bending device 16. The second light bending device 16 receives the light rays 17 and directs the light rays 17 in a second desired lighting pattern having a substantially uniform color and intensity. As shown, the second light bending device 16 directs the light rays 17 to form a substantially annular lighting pattern. However, it is understood that any lighting pattern may be formed, as desired. It is further understood that additional optics such as mirrors may be integrated into the lighting system 10 for directing the light rays 17 to the second light bending device 16.

Figure 8:
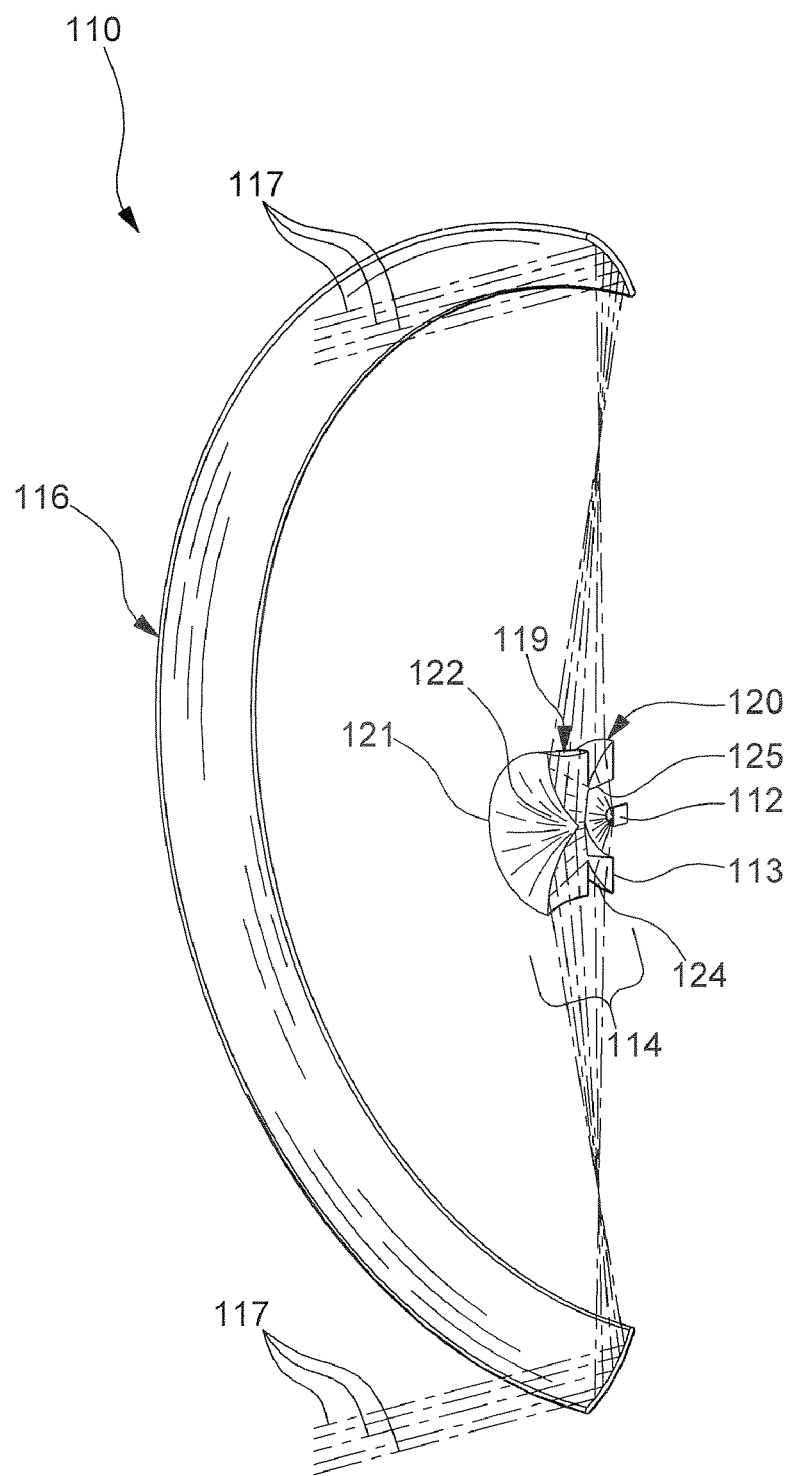
FIG. 8 is a perspective view of a lighting system according to another embodiment of the present invention showing a light pipe and a first light bending device in section to illustrate a path of light rays therethrough.

FIG. 8 shows a lighting system 110 according to another embodiment of the present invention. As shown, the lighting system 110 includes a light source 112, a first light bending device 114, and a second light bending device 116. The light source 112 is disposed adjacent a first side 113 of the first light bending device, wherein light emitted by the light source 112 is substantially collected within the first light bending device 114 and directed to the second light bending device 116 in a substantially uniform lighting pattern. It is understood that the light source 112 may be any conventional light sources such as an LED, for example.

As shown, the second light bending device 116 is a reflector ring disposed substantially uniformly around the periphery of the first light bending device 114 and is adapted to receive light rays 117 directed from the first light bending device 114. Although the second light bending device 116 is shown having a parabolic cross-section, it is understood that the second light bending device 116 may have any size, cross-sectional shape, and optical characteristics, as desired. It is further understood that the second light bending device 116 may be formed from any conventional light reflective material for directing light in a desired lighting pattern.

The first light bending device 114 includes a first portion 119 and a second portion 120. The first portion 119 is shown having a substantially circular disk shape. A second side 121 of the first light bending device 114 has a parabolic indentation 122 for internally reflecting light in a substantially radially outward direction. It is understood that the first portion may have any number of indentation, as desired. Although the indentation 122 is shown having a substantially parabolic shape, it is understood that the indentation 122 may be any shape for producing a desired reflection pattern such as a conical shape, for example. The first portion 119 may be formed from any optical material such as acrylic, polycarbonate, and optical-grade plastics, for example. It is further understood that the first portion 119 of the first light bending device 114 may have any shape for internally collecting and directing light, as desired. The second portion 120 of the first light bending device is shown as a refractive lens having a third side 124 and a fourth side 125. The fourth side 125 defines a cavity in the second portion 120. The curvature and shape of the third side 124 and the fourth side 125 cooperate to provide a desirable refraction pattern. It is understood that the third side 124 and the fourth side 125 may have any shape and curvature, as desired. The second portion 120 may be formed from any conventional optics material such as acrylic, polycarbonate, and optical-grade plastics, for example. It is understood that the second portion 120 of the first light bending device 114 may have any shape for internally collecting and directing light, as desired. The first portion 119 is coupled to the second portion 120 to provide a predetermined first desired lighting pattern. Specifically, the light rays 117 are refracted as they pass through the second portion 120 of the first light bending device 114. A portion of the light rays 117 are directed substantially radially outward from the second portion 120 of the first light bending device 114 and focused toward a pre-determined focal point. Another portion of the light rays 117 pass into the first portion 119 of the first light bending device 114, wherein the light rays 117 are reflected by the internal surface of a surface forming the indentation 122. As shown, the surface forming the indentation 122 is adapted to reflect the light rays 117 radially outward in a substantially focused pattern. The first light bending device 114 directs the light rays 114 substantially uniformly around the periphery of the first light bending device 114. It is understood that the first light bending device 114 may have any shape, size, and optical characteristics for collecting and directing light rays 117, as desired. It is further understood that the first light bending device 114 may include additional optical elements such as reflective surfaces and prisms, as desired.

In use, the light source 112 emits light rays 117 into the first light bending device 114 disposed adjacent the light source 112. The first light bending device 114 directs the light rays 117 radially outward in a substantially uniform first desired lighting pattern to the second light bending device 116 disposed around the periphery of the first light bending device 114. Although only the light rays 117 along a single plane are shown, it is understood that a substantial portion of the light rays 117 emitted from the light collected device 116 are directed radially outward to the second light bending device 116. The second light bending device 116 receives the light rays 117 and directs the light rays 117 in a second desired lighting pattern having a substantially uniform color and intensity. As shown, the second light bending device 116 directs the light rays 117 to form a substantially annular lighting pattern. However, it is understood that any lighting pattern may be formed, as desired. It is further understood that additional optics such as mirrors may be integrated into the lighting system 110 for directing the light rays 117 to the second light bending device 116.

The lighting system 10, 110 and method of the present invention provide a desired lighting pattern having a substantially uniform color and intensity throughout the lighting pattern. The light system 10, 110 provides design flexibility for the light source 12, 112 and associated thermal management while offering unique styling features.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A lighting system comprising:
a light source;
a first light bending device disposed adjacent the light source and receiving a substantial portion of light rays emitted therefrom, wherein the first light bending device includes a first portion and a second portion, the first portion having a substantially circular disk shape with an indentation formed therein for internally reflecting light in a substantially radially outward direction and the second portion disposed between the first portion and the light source, the second portion is a refractive lens having a first side and a second side with a cavity formed therein, the cavity disposed adjacent the light source to receive light emitted from the light source, whereby a curvature and a shape of the first side and the second side cooperate to provide a desirable refraction pattern in a substantially radially outward direction, and wherein the first light bending device one of substantially collimates and focuses the light rays emitted from the light source; and a second light bending device surrounding at least a portion of the first light bending device, wherein the second light bending device receives the directed light rays from the first light bending device and direct the light rays in a second desired lighting pattern.

2. The lighting system according to claim 1, wherein the second light bending device is a light pipe.

3. The lighting system according to claim 1, wherein the second light bending device is a reflector.

4. The lighting system according to claim 1, wherein the second light bending device is a light pipe having a substantially triangular cross-section.

5. A lighting system comprising:
a light source;
a first light bending device disposed adjacent the light source and receiving a substantial portion of light rays emitted therefrom, wherein the first light bending device includes a first portion and a second portion, the first portion having a substantially circular disk shape with an indentation formed therein for internally reflecting light in a substantially radially outward direction and the second portion disposed between the first portion and the light source, the second portion is a refractive lens having a generally dome shape with a curved first side and a second side having a cavity formed therein and disposed adjacent the light source to receive light emitted from the light source, whereby a curvature and a shape of the first side and the second side cooperate to provide a desirable refraction pattern in a substantially radially outward direction; and
a light pipe spaced from the first light bending device and surrounding at least a portion of the first light bending device, wherein the light pipe receives the directed light rays from the first light bending device and direct the light rays in a second desired lighting pattern.

6. The lighting system according to claim 5, wherein the first light bending device substantially collimates the light rays emitted from the light source in a radially outward direction.

7. The lighting system according to claim 6, wherein the light pipe receives the collimated light rays emitted from the first light bending device substantially uniformly across the light pipe.

8. The lighting system according to claim 5, wherein the first light bending device focuses the light rays emitted from the light source in a substantially radially outward direction.

9. The lighting system according to claim 8, wherein the light pipe receives the focused light rays emitted from the first light bending device substantially uniformly across the light pipe.

10. The lighting system according to claim 5, wherein the light pipe has a substantially triangular cross-section.

11. The lighting system according to claim 5, wherein at least a portion of the light emitted from the light source pass through the second portion of the first light bending device prior to passing through the first portion of the first light bending device.

12. A method for providing a lighting pattern, the method comprising the steps of:
providing a first light bending device disposed adjacent a light source and receiving a substantial portion of light rays emitted therefrom, wherein the first light bending device includes a first portion and a second portion, the first portion having a substantially circular disk shape with an indentation formed therein for internally reflecting light in a substantially radially outward direction and the second portion disposed between the first portion and the light source, the second portion is a refractive lens having a generally dome shape with a curved first side and a second side having a cavity formed therein, whereby a curvature and a shape of the first side and the second side cooperate to provide a desirable refraction pattern in a substantially radially outward direction;
spacing a second light bending device from the first light bending device, the second light bending device surrounding at least a portion of the first light bending device, wherein the second light bending device is receives the directed light rays from the first light bending device; and
directing at least a portion of the light rays emitted from the light source through the first light bending device and then the second light bending device to provide a second desired lighting pattern.

13. The method according to claim 12, wherein the second light bending device is one of a reflector and a light pipe.

14. The method according to claim 12, wherein the first light bending device includes a first portion and a second portion, the first portion having a substantially disk-like shape with a substantially parabolic indentation for reflecting light rays and the second portion adapted to refract light rays.

15. The method according to claim 12, wherein the second light bending device is a light pipe having a substantially triangular cross-section.

* * * * *